US009950869B1

(12) United States Patent
Pryor et al.

(10) Patent No.: US 9,950,869 B1
(45) Date of Patent: Apr. 24, 2018

(54) BELT TENSIONER IN A FOOD PROCESSING MACHINE

(71) Applicant: Provisur Technologies, Inc., Chicago, IL (US)

(72) Inventors: Glen F. Pryor, Manhattan, IL (US); Ryan J. O'Connor, Bolingbrook, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

(21) Appl. No.: 15/398,666

(22) Filed: Jan. 4, 2017

(51) Int. Cl.
*B65G 23/44* (2006.01)

(52) U.S. Cl.
CPC .................... *B65G 23/44* (2013.01)

(58) Field of Classification Search
CPC ............. B65G 23/44; F16H 2007/0842; F16H 2007/0844
USPC .................................................. 198/813–816
See application file for complete search history.

(56) References Cited

U.S. PATENT DOCUMENTS

| 3,846,957 | A |   | 11/1974 | Divan |
| 3,848,491 | A |   | 11/1974 | Flesch |
| 4,356,205 | A |   | 10/1982 | Richards |
| 4,428,263 | A |   | 1/1984 | Lindee et al. |
| 4,745,681 | A |   | 5/1988 | Hollis, Jr. et al. |
| 4,763,738 | A |   | 8/1988 | Kuchler |
| 5,065,656 | A |   | 11/1991 | Flisram |
| 5,117,717 | A |   | 6/1992 | Mally |
| 5,129,298 | A |   | 7/1992 | Cresson et al. |
| 5,164,777 | A | * | 11/1992 | Agarwal .............. G03G 15/755 198/814 |
| 5,169,221 | A |   | 12/1992 | Wheeler |
| 5,271,340 | A |   | 12/1993 | Whitney |
| 5,481,466 | A |   | 1/1996 | Carey |
| 5,564,554 | A | * | 10/1996 | Lawrence .............. B65G 21/14 198/418.6 |
| 5,628,237 | A |   | 5/1997 | Lindee et al. |
| 5,720,654 | A |   | 2/1998 | MacDonald |
| 5,724,874 | A |   | 3/1998 | Lindee et al. |
| 5,787,776 | A |   | 8/1998 | Nishimoto |
| 5,787,801 | A |   | 8/1998 | Kirk et al. |

(Continued)

FOREIGN PATENT DOCUMENTS

EP 0713753 A2 5/1996

OTHER PUBLICATIONS

Notification of Transmittal of the International Search Report and The Written Opinion of the International Searching Authority, or the Declaration, dated Dec. 18, 2017, for PCT/US17/63333, 7 pages.

(Continued)

*Primary Examiner* — William R Harp
(74) *Attorney, Agent, or Firm* — Klintworth & Rozenblat IP LLP

(57) ABSTRACT

A belt tensioner for a food processing machine includes a base member, a nose member, a belt member, and a driving member. The nose member is pivotally connected with the base member. The belt member is moveably disposed around the base member and the nose member. The driving device is configured to pivotally move the nose member relative to the base member. As the nose member pivotally moves relative to the base member the nose member applies variable levels of tension on the belt member.

20 Claims, 13 Drawing Sheets

(56) References Cited

U.S. PATENT DOCUMENTS

| | | |
|---|---|---|
| 5,875,697 A | 3/1999 | Cole et al. |
| 5,974,925 A | 11/1999 | Lindee et al. |
| 5,988,033 A | 11/1999 | Skaar et al. |
| 6,164,174 A | 12/2000 | Sigurdsson et al. |
| 6,484,615 B2 | 11/2002 | Lindee |
| 6,585,580 B1 | 7/2003 | Hergott |
| 6,591,723 B1 | 7/2003 | Jung |
| 6,763,750 B2 | 7/2004 | Lindee |
| 6,883,409 B1 | 4/2005 | Spix et al. |
| 7,073,419 B2 | 7/2006 | Weber |
| 7,089,840 B2 | 8/2006 | Freudinger et al. |
| 7,270,039 B2 | 9/2007 | Lindee |
| 7,278,344 B2 | 10/2007 | Pryor |
| 7,299,728 B2 | 11/2007 | Ferrin et al. |
| 7,306,444 B2 | 12/2007 | Heinzen et al. |
| 7,377,201 B2 | 5/2008 | Chen |
| 7,600,459 B2 | 10/2009 | Bodey et al. |
| 7,603,936 B2 | 10/2009 | Pryor et al. |
| 8,091,458 B2 | 1/2012 | Culling |
| 8,109,186 B2 | 2/2012 | Culling |
| 8,250,955 B2 | 8/2012 | Sandberg et al. |
| 8,336,434 B2 | 12/2012 | Sandberg et al. |
| 8,408,108 B2 | 4/2013 | Redemann et al. |
| 8,408,109 B2 | 4/2013 | Lindee et al. |
| 8,473,094 B2 | 6/2013 | Becker et al. |
| 8,596,175 B2 | 12/2013 | Weber |
| 8,616,099 B2 | 12/2013 | Hallvardsson et al. |
| 8,777,284 B2 | 7/2014 | Schaller et al. |
| 8,812,146 B2 | 8/2014 | Einarsson et al. |
| 8,850,938 B2 | 10/2014 | Lindee et al. |
| 8,869,664 B2 | 10/2014 | Eyles et al. |
| 8,978,529 B2 | 3/2015 | Pasek |
| 9,062,689 B2 | 6/2015 | Schaaf |
| 9,095,144 B1 | 8/2015 | Sekerak et al. |
| 9,173,431 B2 | 11/2015 | Kodali |
| 9,272,428 B2 | 3/2016 | Müller et al. |
| 9,296,120 B2 | 3/2016 | McLaughlin et al. |
| 9,375,859 B2 | 6/2016 | Weber |
| 9,381,660 B2 | 7/2016 | Schaub |
| 9,399,531 B2 | 7/2016 | Pryor et al. |
| 9,457,487 B2 | 10/2016 | Mayer |
| 2002/0098791 A1 | 7/2002 | Handel et al. |
| 2004/0035276 A1 | 2/2004 | Weber |
| 2005/0132864 A1 | 6/2005 | Biggs et al. |
| 2006/0219069 A1 | 10/2006 | Skaar et al. |
| 2008/0000337 A1 | 1/2008 | Dickover et al. |
| 2008/0016999 A1 | 1/2008 | Mathues et al. |
| 2008/0196566 A1 | 8/2008 | Culling |
| 2008/0196603 A1 | 8/2008 | Culling |
| 2008/0236108 A1 | 10/2008 | Parmley et al. |
| 2009/0120256 A1 | 5/2009 | Pasek |
| 2009/0188357 A1 | 7/2009 | Lindee et al. |
| 2009/0188363 A1 | 7/2009 | Lindee et al. |
| 2010/0038210 A1 | 2/2010 | Cox et al. |
| 2010/0288093 A1 | 11/2010 | Seager et al. |
| 2010/0307303 A1 | 12/2010 | Weber |
| 2010/0307304 A1 | 12/2010 | Weber |
| 2011/0126680 A1 | 6/2011 | Weber |
| 2011/0247466 A1 | 10/2011 | Weber |
| 2011/0265621 A1 | 11/2011 | Schmidt |
| 2011/0265624 A1 | 11/2011 | Pasek et al. |
| 2012/0060659 A1 | 3/2012 | Weber |
| 2012/0073415 A1 | 3/2012 | Maidel et al. |
| 2012/0085216 A1 | 4/2012 | Lobbia et al. |
| 2012/0086226 A1 | 4/2012 | Weber |
| 2013/0019722 A1 | 1/2013 | Eyles et al. |
| 2013/0104709 A1 | 5/2013 | Rother |
| 2013/0108409 A1 | 5/2013 | Wu et al. |
| 2013/0139665 A1 | 6/2013 | Sperry et al. |
| 2014/0174891 A1 | 6/2014 | Mayer |
| 2014/0208917 A1 | 7/2014 | Whitney |
| 2014/0262669 A1 | 9/2014 | Conti et al. |
| 2014/0338509 A1 | 11/2014 | Lindee et al. |
| 2014/0352505 A1 | 12/2014 | Grasselli |
| 2015/0013516 A1 | 1/2015 | Bifulco |
| 2015/0122095 A1 | 5/2015 | Schmeiser |
| 2015/0135921 A1 | 5/2015 | Martinez-Montes |
| 2015/0202786 A1 | 7/2015 | Mayer et al. |
| 2015/0321372 A1 | 11/2015 | Fox et al. |
| 2016/0144527 A1 | 5/2016 | Achenbach et al. |
| 2016/0271822 A1 | 9/2016 | Burk et al. |

OTHER PUBLICATIONS

Notification of Transmittal of the International Search Report and The Written Opinion of the International Searching Authority, or the Declaration, dated Feb. 1, 2018, for PCT/US17/63335, 9 pages.

Notification of Transmittal of the International Search Report and The Written Opinion of the International Searching Authority, or the Declaration, dated Feb. 15, 2018, for PCT/US17/63332, 9 pages.

Notification of Transmittal of the International Search Report and The Written Opinion of the International Searching Authority, or the Declaration, dated Feb. 16, 2018, for PCT/US17/65561, 11 pages.

* cited by examiner

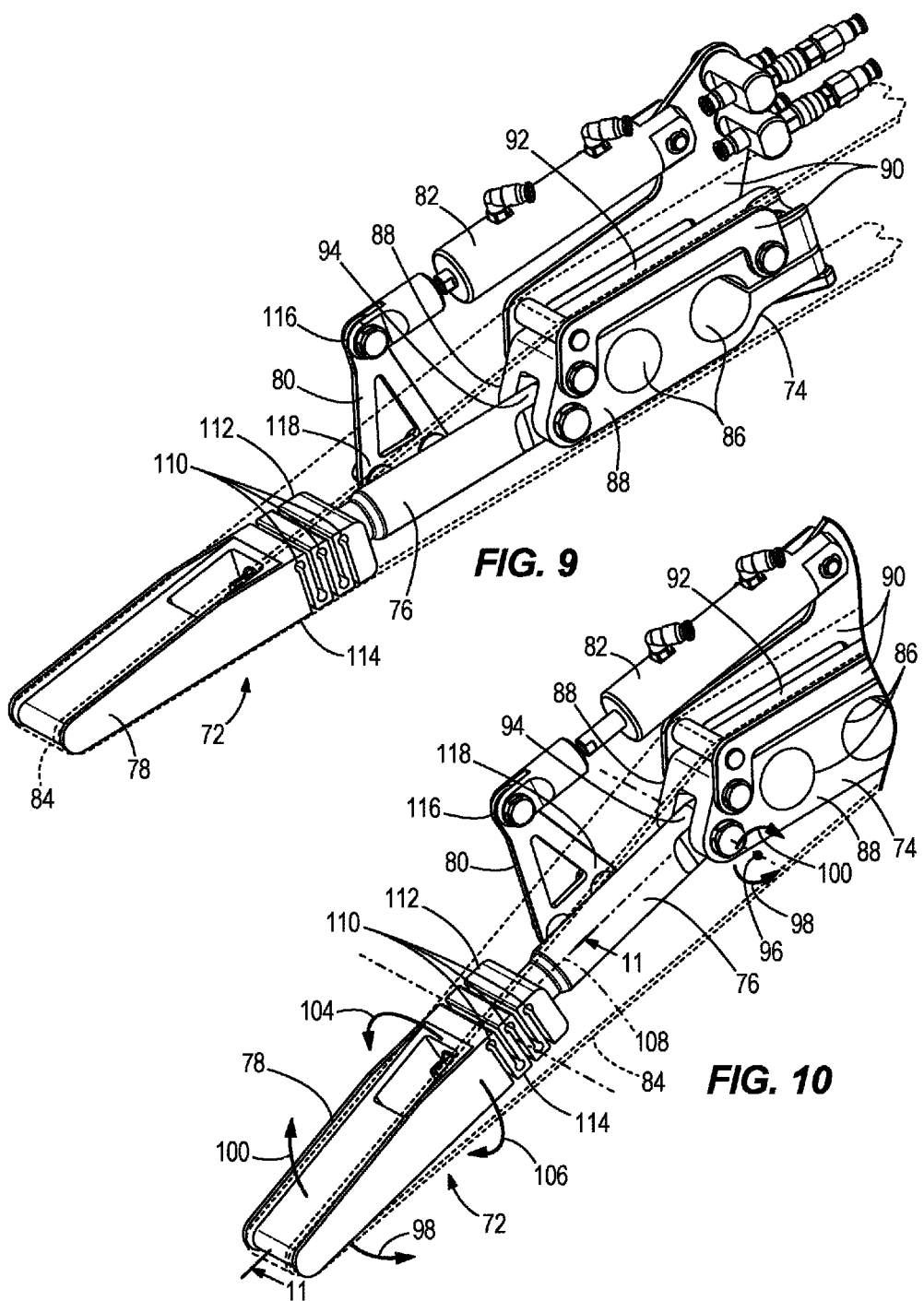

BELT TENSIONER IN A FOOD PROCESSING MACHINE

FIELD OF THE DISCLOSURE

This disclosure relates to the use of one or more belt tensioners in a food processing machine.

BACKGROUND

Food processing machines typically use in-feeds to advance food product. The in-feeds often comprise belt members for moving the food product. Some of the food processing machines utilize a constant, unchanging level of tension on the belt members to move the food product. This leads to difficulty in handling differing types/shapes of food product, and maintenance issues when food product vary. Other food processing machines utilize belt members which are fixed in their configuration relative to one another. This again leads to difficulty in handling differing types/shapes of food product. Still other food processing machines utilize complex belt tensioning systems to vary the tension of the belt members. These belt tensioning systems are expensive to manufacture, and are difficult to maintain.

A belt tensioner for a food processing machine, and method of its use, is needed to overcome one or more of the issues associated with one or more of the existing belt tensioning systems.

SUMMARY

In one embodiment of the disclosure, a belt tensioner for a food processing machine includes a base member, a nose member, a belt member, and a driving member. The nose member is pivotally connected with the base member. The belt member is moveably disposed around the base member and the nose member. The driving device is configured to pivotally move the nose member relative to the base member. As the nose member pivotally moves relative to the base member the nose member applies variable levels of tension on the belt member.

In another embodiment of the disclosure, a belt tensioner for a food processing machine includes a base member, a nose member, a belt member, and a driving device. The nose member is pivotally connected with the base member. The nose member includes a plurality of springs disposed within the nose member. The nose member is passively rotatably connected with the base member around a first axis which is perpendicular to a second axis around which the nose member pivots relative to the base member. The belt member is moveably disposed around the base member and the nose member. The driving device is configured to pivotally move the nose member relative to the base member around the second axis. As the nose member pivotally moves relative to the base member, the nose member applies variable levels of tension on the belt member.

In yet another embodiment of the disclosure, a method of operating a belt tensioner in a food processing machine is disclosed. In one step, a nose member is pivoted, with a driving device, relative to a base member connected with the nose member to apply varying levels of tension on a belt member disposed around the base member and the nose member. In another step, the belt member is moved around the base member and the nose member with a motor.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 9 illustrates a top perspective view of only one of the plurality of in-feed cartridges of FIG. 8 shown by itself;

FIG. 10 illustrates a top perspective view of a front portion of the one in-feed cartridge of FIG. 9 illustrating pivoting and rotational movement of the in-feed cartridge;

DETAILED DESCRIPTION

Figure 1:
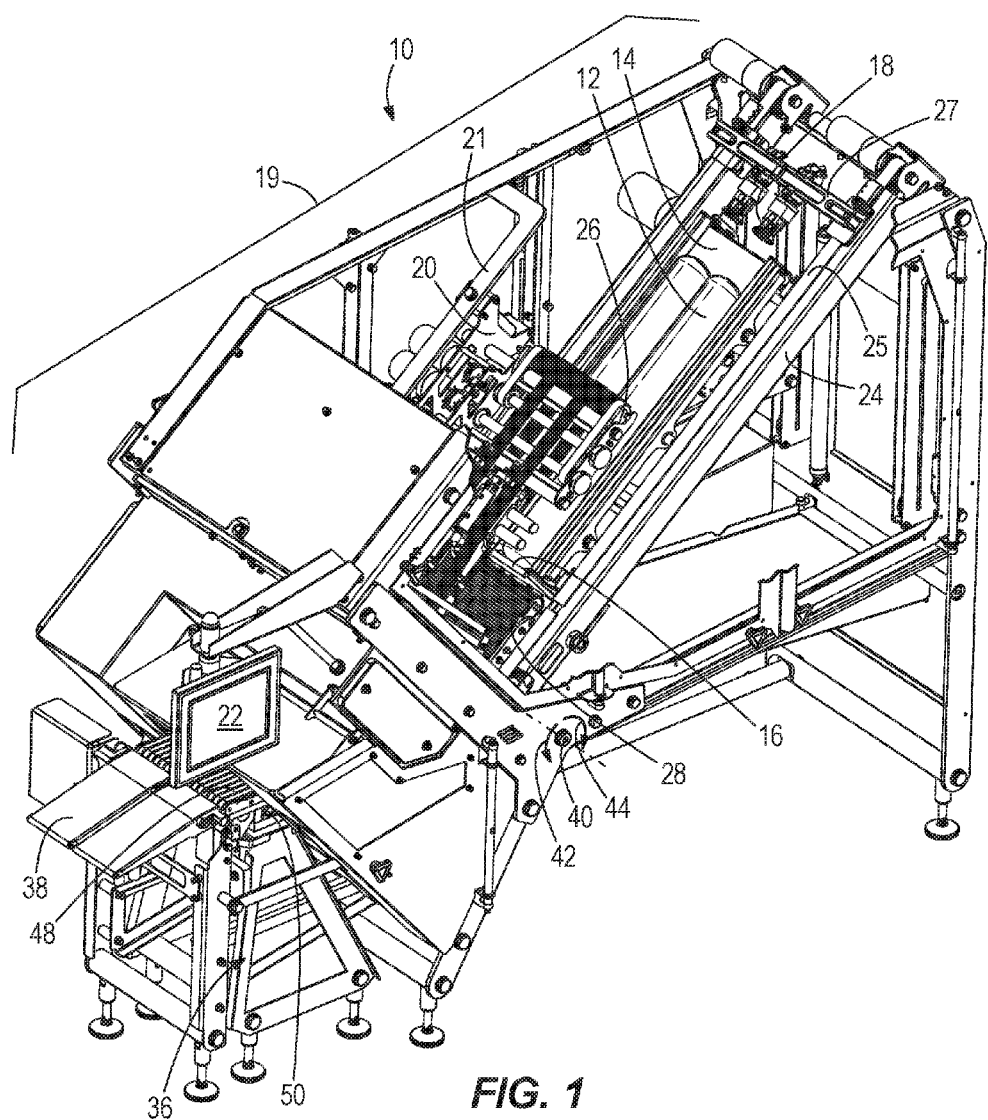
FIG. 1 illustrates a side perspective view of one embodiment of a food processing machine with a food product disposed in a product tray in a raised position, held in place by a gate, with a gripping device disposed apart from the food product.
Figure 2:
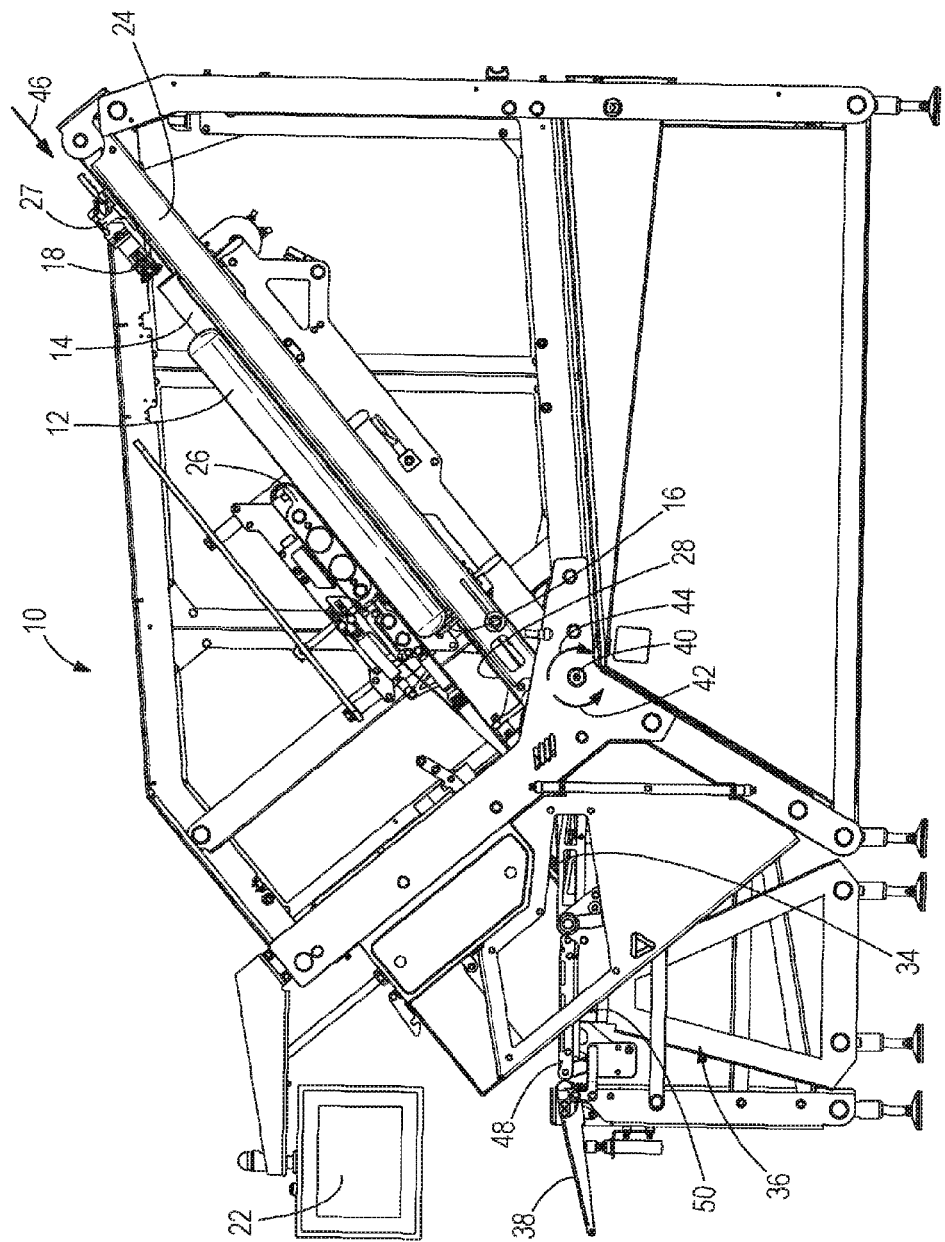
FIG. 2 illustrates a side view of the food processing machine of the embodiment of FIG. 1 with the food product disposed in the product tray in the raised position, held in place by the gate, with the gripping device disposed apart from the food product.
Figure 3:
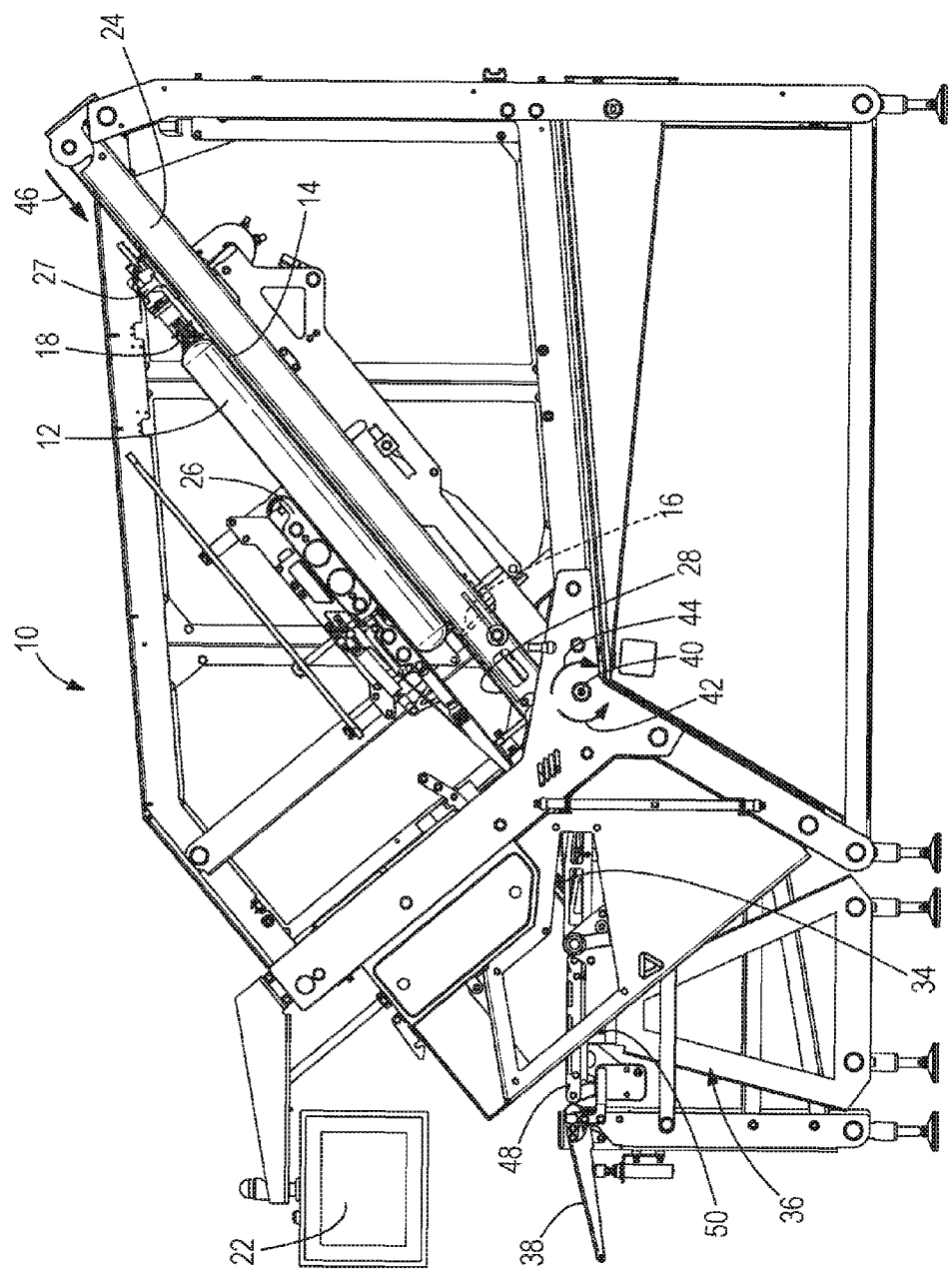
FIG. 3 illustrates a side view of the food processing machine of the embodiment of FIG. 1 with the food product disposed in the product tray in the raised position, with the gate having been lowered away from the food product, with the gripping device disposed against an end of the food product holding the food product in place.
Figure 4:
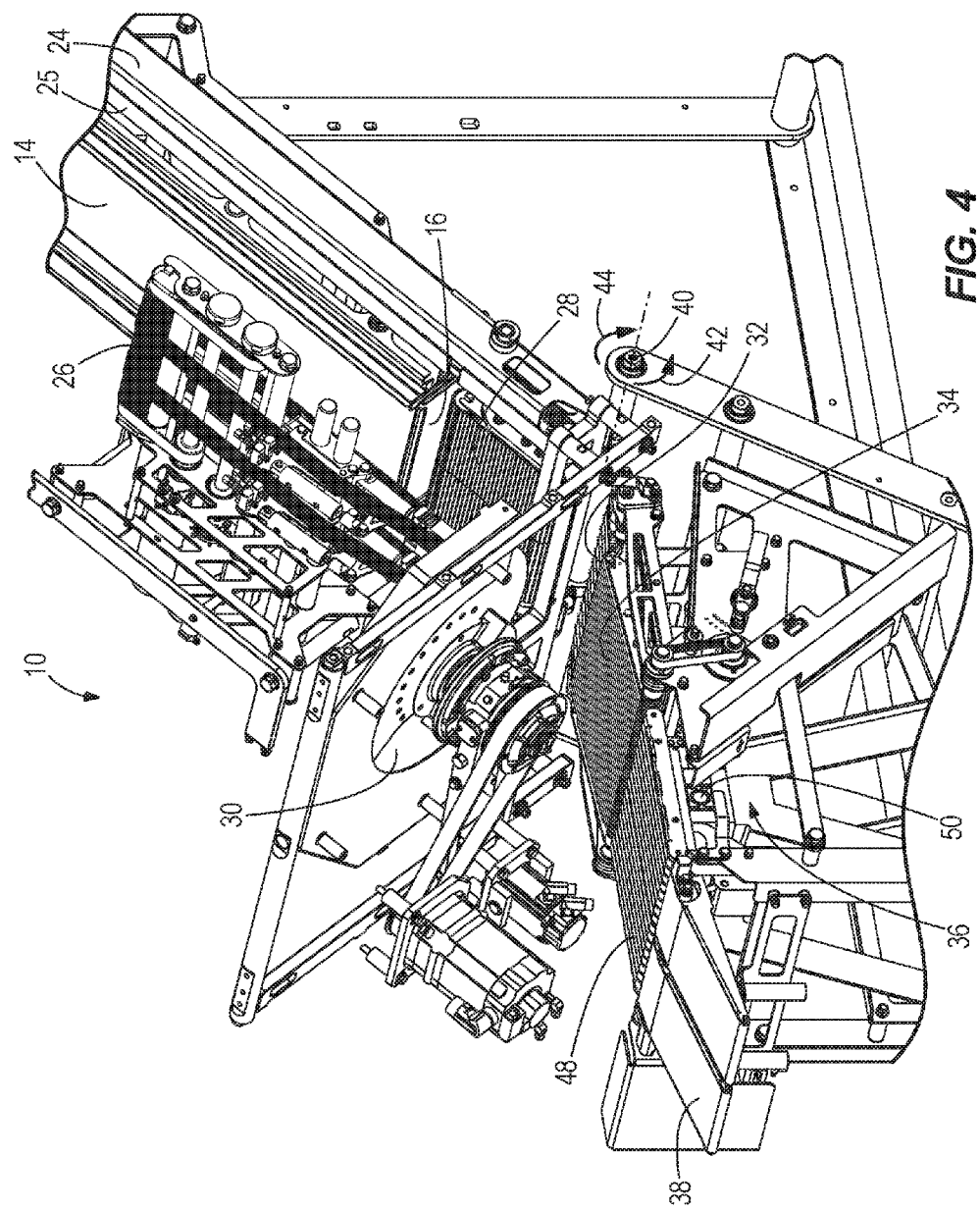
FIG. 4 illustrates a partial side perspective view of the food processing machine of the embodiment of FIG. 1 with an upper exterior frame of the food processing machine of FIG. 1 removed, and the food product of FIG. 1 removed to assist in viewing internal components, but illustrating a first frame and a second frame of an upper in-feed.
Figure 5:
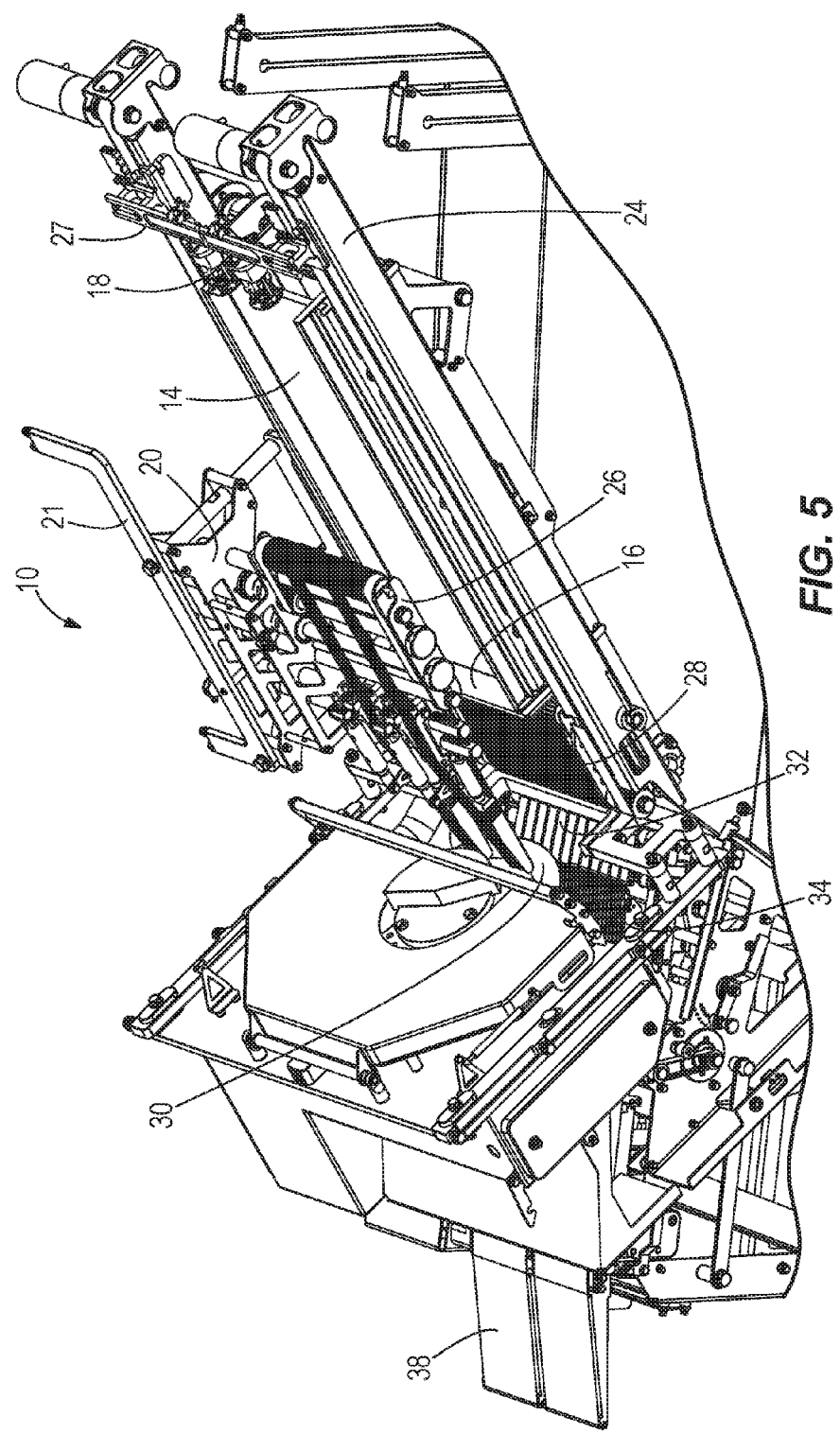
FIG. 5 illustrates a top partial perspective view of the food processing machine of the embodiment of FIG. 1 with the upper exterior frame of the food processing machine of FIG. 1 removed, and the food product of FIG. 1 removed to assist in viewing internal components, but illustrating the first frame and the second frame of the upper in-feed.

FIG. 1 illustrates a side perspective view of one embodiment of a food processing machine 10 with a food product 12 disposed in a product tray 14 in a raised position, held in place by a gate 16, with a gripping device 18 disposed apart from the food product. FIG. 2 illustrates a side view of the food processing machine 10 of the embodiment of FIG. 1 with the food product 12 disposed in the product tray 14 in the raised position, held in place by the gate 16, with the gripping device 18 disposed apart from the food product 12. FIG. 3 illustrates a side view of the food processing machine 10 of the embodiment of FIG. 1 with the food product 12 disposed in the product tray 14 in the raised position, with the gate 16 having been lowered away from the food product 12, with the gripping device 18 disposed against an end of the food product 12 holding the food product 12 in place. FIG. 4 illustrates a partial side perspective view of the food processing machine 10 of the embodiment of FIG. 1 with an upper exterior frame 19 of the food processing machine 10 of FIG. 1 removed, and the food product 12 of FIG. 1 removed to assist in viewing internal components, but illustrating first frame 20 and second frame 21 of the upper in-feed 26. FIG. 5 illustrates a top partial perspective view of the food processing machine 10 of the embodiment of FIG. 1 with the upper exterior frame 19 of the food processing machine 10 of FIG. 1 removed, and the food product 12 of FIG. 1 removed to assist in viewing internal components, but illustrating the first frame 20 and the second frame 21 of the upper in-feed 26.

As shown collectively in FIGS. 1-5, the food processing machine 10 comprises the product tray 14, the gate 16, the gripping device 18, the upper exterior frame 19, a control system 22, a product tray lift 24, a belt 25, the upper in-feed 26, a bracket 27, a lower in-feed 28, a slicing device 30, a slicing conveyor 32, a transfer conveyor 34, an exposed load cell device 36, and a classifier device 38.

The control system 22, comprising at least one processor with at least one memory comprising programming instructions for execution by the at least one processor, is adapted to control the entire food processing machine 10 including all of its components identified herein. As such, all movements or actions of any components of the food processing machine 10 described herein are controlled by the control system 22. The product tray lift 24 is adapted to rotate around pivot point 40 in counter-clockwise and clockwise directions 42 and 44 in order to respectfully raise and lower the product tray 14. Initially, the food product 12 is loaded in the product tray 14 while the product tray lift 24 has the product tray 14 disposed in a horizontal position (not shown) with the gate 16 holding the food product 12 in the product tray 14. After the food product 12 is loaded in the product tray 14, the product tray lift 24 is rotated in counter-clockwise direction 42 around pivot point 40 to dispose the product tray 14, the gate 16, and the food product 12 held within the product tray 14 by the gate 16 in the position of FIG. 2.

Next, the gripping device 18 is moved from its raised position apart from the food product 12 as shown in FIG. 2 in direction 46 to a lowered position against an end of the food product 12 as shown in FIG. 3. The gripping device 18 is moved from its raised position to its lowered position against the end of the food product 12 by rotating a belt 25 in a counter-clockwise direction 42, which in turn moves a bracket 27 attached to the belt 25 to the lowered position, which in turn moves the gripping device 18 attached to the bracket 27 to the lowered position. After the gripping device 18 contacts the end of the food product 12, the gripping device 18 closes to grip an end of the food product 12. Subsequently, the gate 16 is moved away from its position against the food product 12 as shown in FIG. 2 to its lowered position as shown in FIG. 3 so that the gate 16 no longer blocks the food product 12 from moving out of the product tray 14.

Next, the upper in-feed 26 is rotated clockwise 44 and the lower in-feed 28 is rotated counter-clockwise 42 while the gripping device 18 is moved further in direction 46, by rotating the belt 25 in the counter-clockwise direction 42 to move the attached bracket 27 and the attached gripping device 18, to gradually move the food product 12 into the slicing device 30. The slicing device 30 slices the food product 12 which then falls onto the slicing conveyor 32 which is located directly underneath the slicing device 30. The slicing conveyor 32 rotates counter-clockwise 42 to move the sliced food product 12 to and onto the transfer conveyor 34 which is disposed next to the slicing conveyor 32. The transfer conveyor 34 rotates counter-clockwise to move the sliced food product 12 to and onto an exposed load cell conveyor 48 of the exposed load cell device 36 which is next to the transfer conveyor 34.

The exposed load cell 50 of the exposed load cell device 36 weighs the sliced food product 12, and then the exposed load cell conveyor 48 of the exposed load cell device 36 moves the weighed and sliced food product 12 to and onto a classifier device 38 which is disposed next to the exposed load cell device 36. The exposed load cell 50 of the exposed load cell device 36 is permanently exposed (i.e. not contained within a protective housing) providing accessible cleaning so that the exposed load cell 50 can be easily washed with a liquid, such as by spraying the exposed load cell 50 with a nozzle, in order to clean the exposed load cell 50 without having to remove the exposed load cell 50 from a protective housing. This provides ease of access to the exposed load cell 50 which reduces the time and cost of cleaning and maintenance.

The classifier device 38 classifies the weighed and sliced food product 12 by determining whether the weighed and sliced food product 12 meets an acceptable criteria in part based on the determined weight of the weighed and sliced food product 12, as determined by the exposed load cell device 36. The weighed and sliced food product 12 which is determined by the classifier device 38 to meet the acceptable criteria is then packaged. The weighed and sliced food product 12 which is determined by the classifier device to not meet the acceptable criteria is then discarded or used for other purposes.

Figure 6:
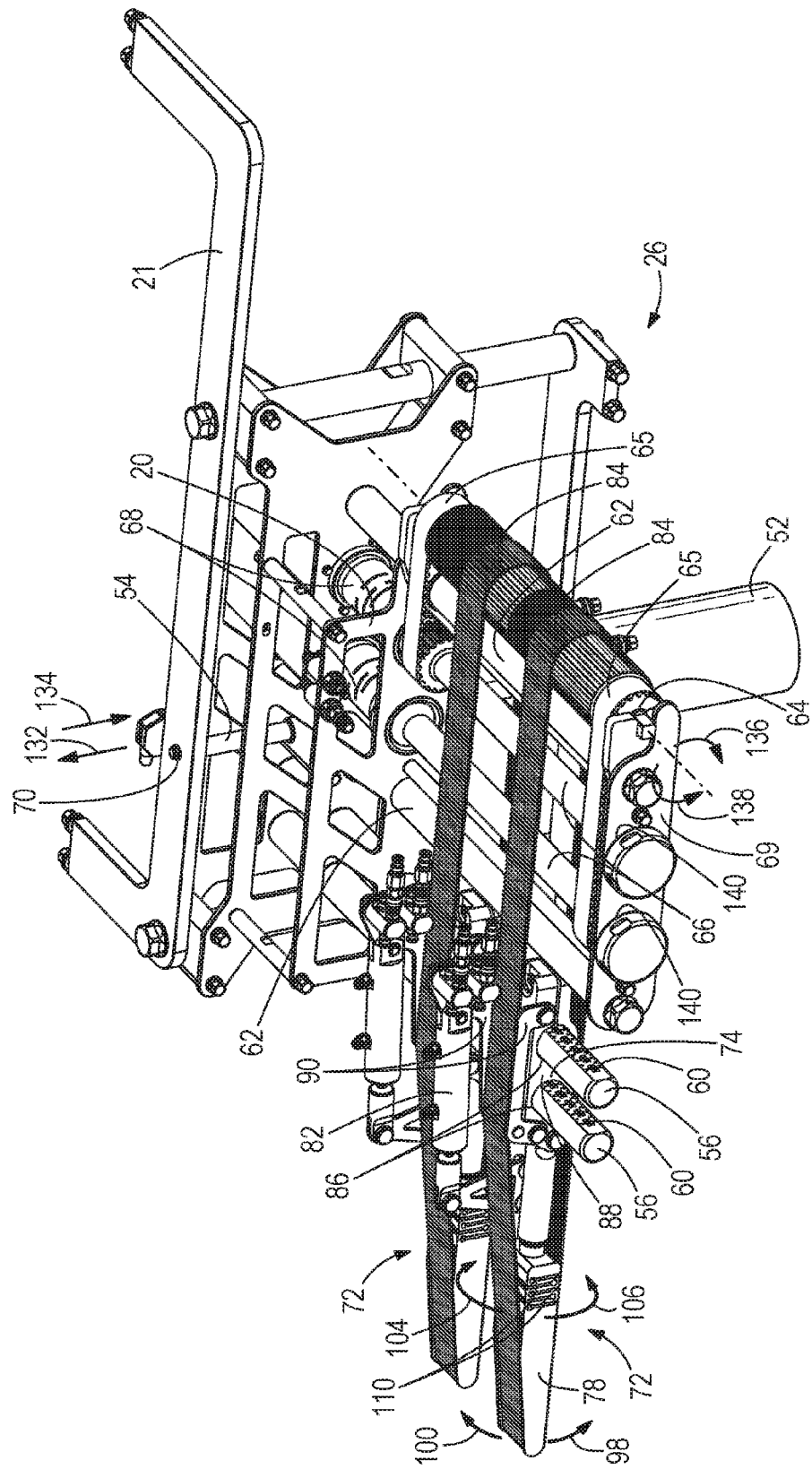
FIG. 6 illustrates a top perspective view of the upper in-feed separated from the food processing machine of the embodiment of FIG. 1.

FIG. 6 illustrates a top perspective view of the upper in-feed 26 separated from the food processing machine 10 of the embodiment of FIG. 1. The upper in-feed 26 comprises the first frame 20, the second frame 21, a motor (also referred to as "an additional motor" herein) 52, a screw rod 54, a plurality of attachment shafts 56, a plurality of spaced-apart connection members 60, a plurality of bracket-attachment shafts 62, a tension member 64, a plurality of driving belts 65, a plurality of motor shafts 66, a plurality of motors 68, a bracket 69, a sensor 70, and a plurality of in-feed cartridges (also referred to as belt-tensioners) 72. It is noted that each of the plurality of in-feed cartridges 72 are identical. In other embodiments, the upper in-feed 26 may vary. For instance, any of the components of the upper in-feed 26 may vary in type, configuration, position, number, location, spacing, or function.

Figure 7:
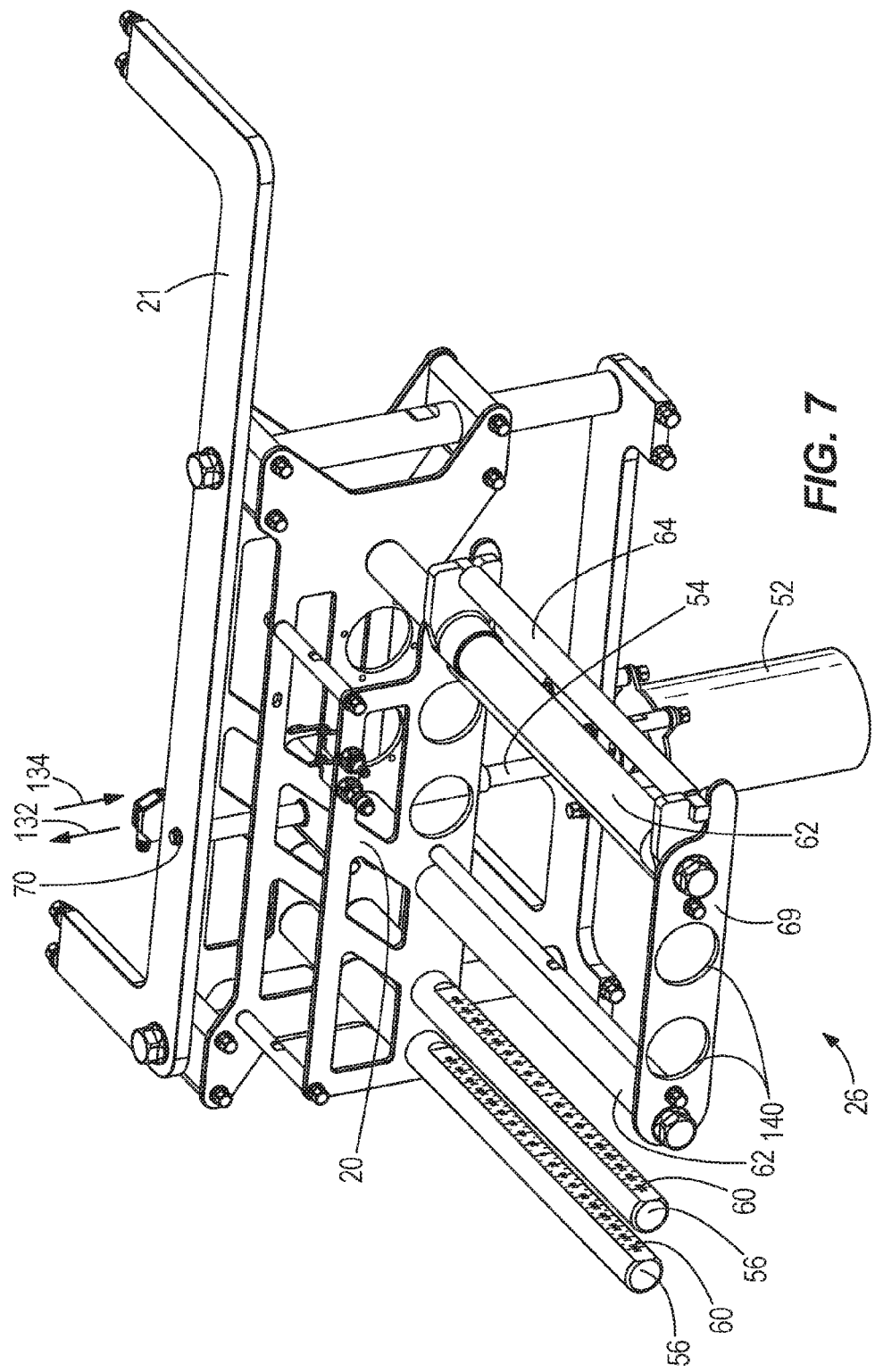
FIG. 7 illustrates the top perspective view of the upper in-feed of FIG. 6 separated from the food processing machine of the embodiment of FIG. 1 with a plurality of in-feed cartridges and a plurality of motors removed.
Figure 8:
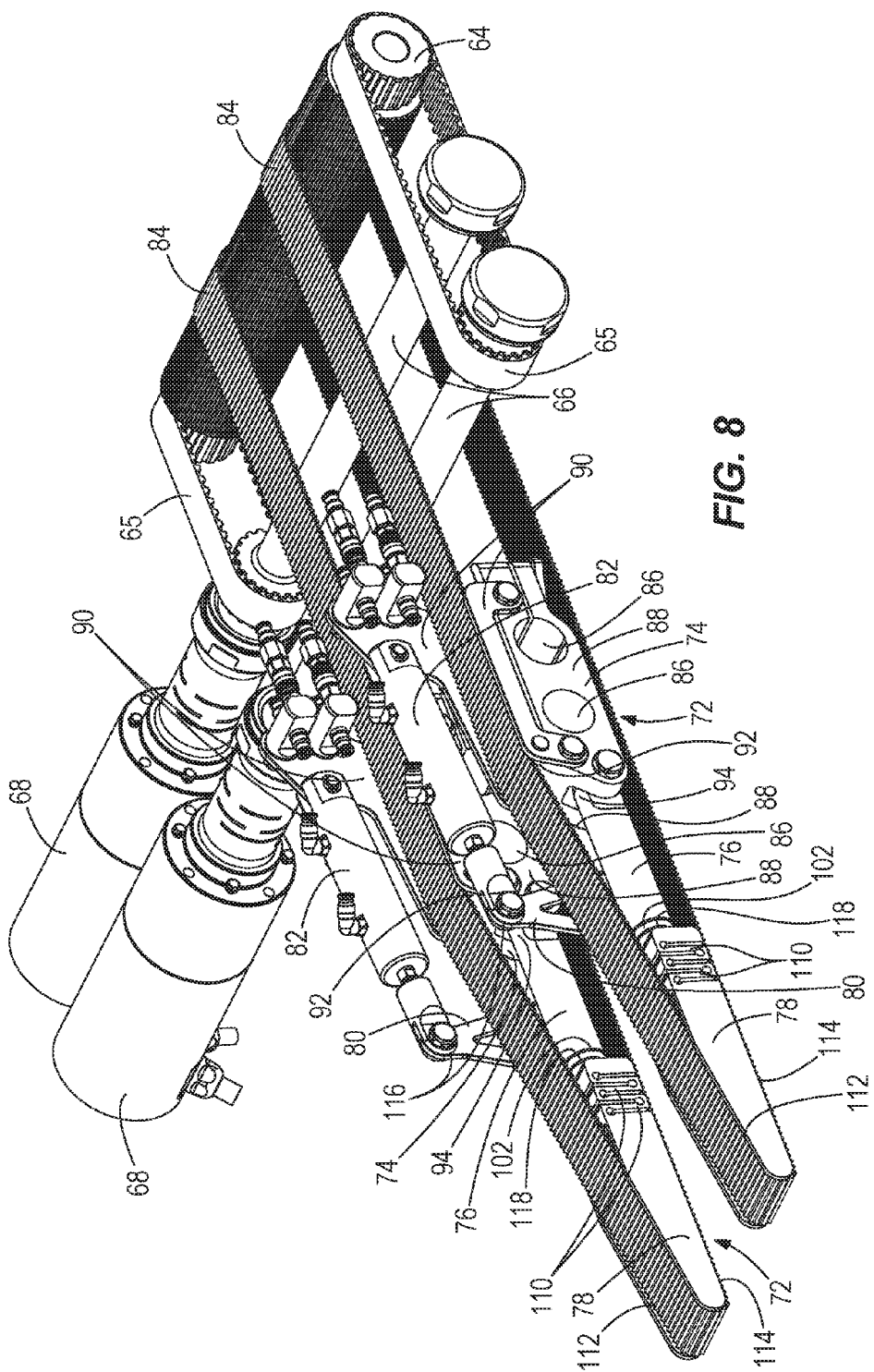
FIG. 8 illustrates a top perspective view of the plurality of in-feed cartridges and the plurality of motors of FIG. 6 separated from the remainder of the upper in-feed.
Figure 11:
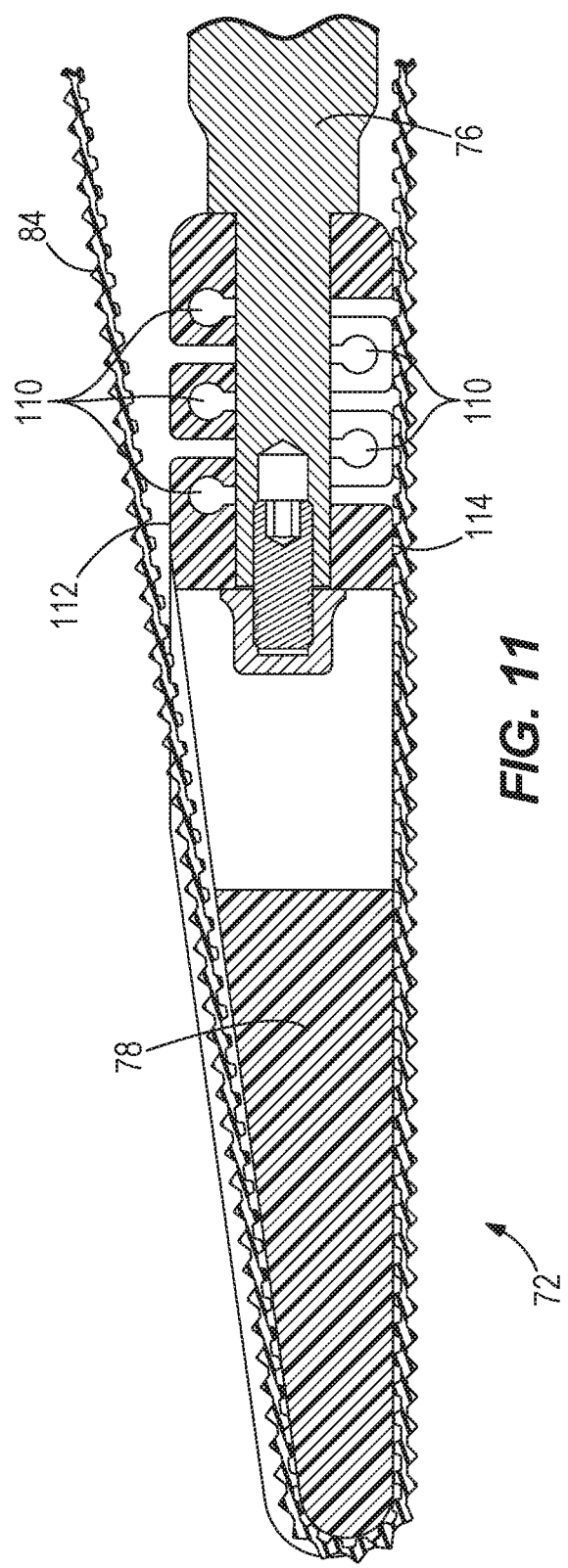
FIG. 11 illustrates a cross-sectional view through line 11-11 of the front portion of the one in-feed cartridge of FIG. 10.

FIG. 7 illustrates the top perspective view of the upper in-feed 26 of FIG. 6 separated from the food processing machine 10 of the embodiment of FIG. 1 with the plurality of in-feed cartridges 72, the plurality of driving belts 65, the plurality of motor shafts 66, and the plurality of motors 68 shown in FIG. 6 removed. FIG. 8 illustrates a top perspective view of the plurality of in-feed cartridges 72, the plurality of motor shafts 66, the plurality of motors 68, the tension member 64, and the plurality of driving belts 65 of FIG. 6 separated from the remainder of the upper in-feed 26 of FIG. 6. FIG. 9 illustrates a top perspective view of only one of the plurality of in-feed cartridges 72 of FIG. 8 shown by itself, although each of the plurality of in-feed cartridges 72 are identical as previously mentioned. In other embodiments, the plurality of in-feed cartridges 72 may vary. FIG. 10 illustrates a top perspective view of a front portion of the one in-feed cartridge (also referred to as belt-tensioner) 72 of FIG. 9 illustrating pivoting and rotational movement of the in-feed cartridge 72. FIG. 11 illustrates a cross-sectional view through line 11-11 of the front portion of the one in-feed cartridge 72 of FIG. 10.

As shown in FIGS. 8, 9, 10, and 11 collectively, each in-feed cartridge 72 comprises a base member 74, a rod 76, a nose member 78, a connecting member 80, a driving device 82, and a belt member 84. The base member 74 comprises a plurality of parallel holes 86 extending through opposed sides 88 of the base member 74 configured to connect the base member 74 with the plurality of attachment shafts 56 (FIG. 6) of the food processing machine 10 (FIG. 1). A plurality of opposed rails 90 are connected with the opposed sides 88 of the base member 74 and extend over a top 92 of the base member 74. One end 94 of the rod 76 is pivotally connected to the base member 74 around second axis 96 to pivot in either of directions 98 or 100. A second end 102 of the rod 76 is connected to the nose member 78. In such manner, the nose member 78 is configured to pivotally move with the rod 76 in either of directions 98 or 100 around second axis 96 of the base member 74, making the nose member 78 pivotally connected with the base member 74 around second axis 96 of the base member 74 to provide relative movement between the nose member 78 and the rod 76 with the base member 74. The belt member 84 is disposed between the plurality of opposed rails 90 and is moveably disposed around the base member 74, the rod 76, and the nose member 78 with any of the plurality of motors 68 to which it is connected with.

The nose member 78 is configured to passively rotate in either of directions 104 or 106 around first axis 108 of the rod 76 which is perpendicular to second axis 96 through the base member 74. A plurality of springs 110 are disposed within the nose member 78 extending between top and bottom surfaces 112 and 114 of the nose member 78. The plurality of springs 110 allow the bottom surface 114 of the nose member 78 to passively compress or expand as the belt member 84 comes into contact with food product 12 (FIG. 1) of irregular shapes. A first end 116 of the connecting member 80 is connected with the driving device 82. A second end 118 of the connecting member 80 is connected with the rod 76. The driving device 82 comprises a pneumatic cylinder. In other embodiments, the driving device 82 may vary.

The driving device 82 is configured to pivot the rod 76 and the connected nose member 78 in either of directions 98 or 100 around the second axis 96 of the base member 74. In such manner, the nose member 78 can be pivoted in direction 98 around the second axis 96 of the base member 74 to lower the nose member 78 towards the food product 12 (FIG. 1) to provide increasing tension on the belt member 84 against the food product 12 (FIG. 1) or pivoted in direction 100 around the second axis 96 of the base member 74 to raise the nose member 78 away from the food product 12 (FIG. 1) to provide decreasing tension on the belt member 84 against the food product 12 (FIG. 1).

Figure 12:
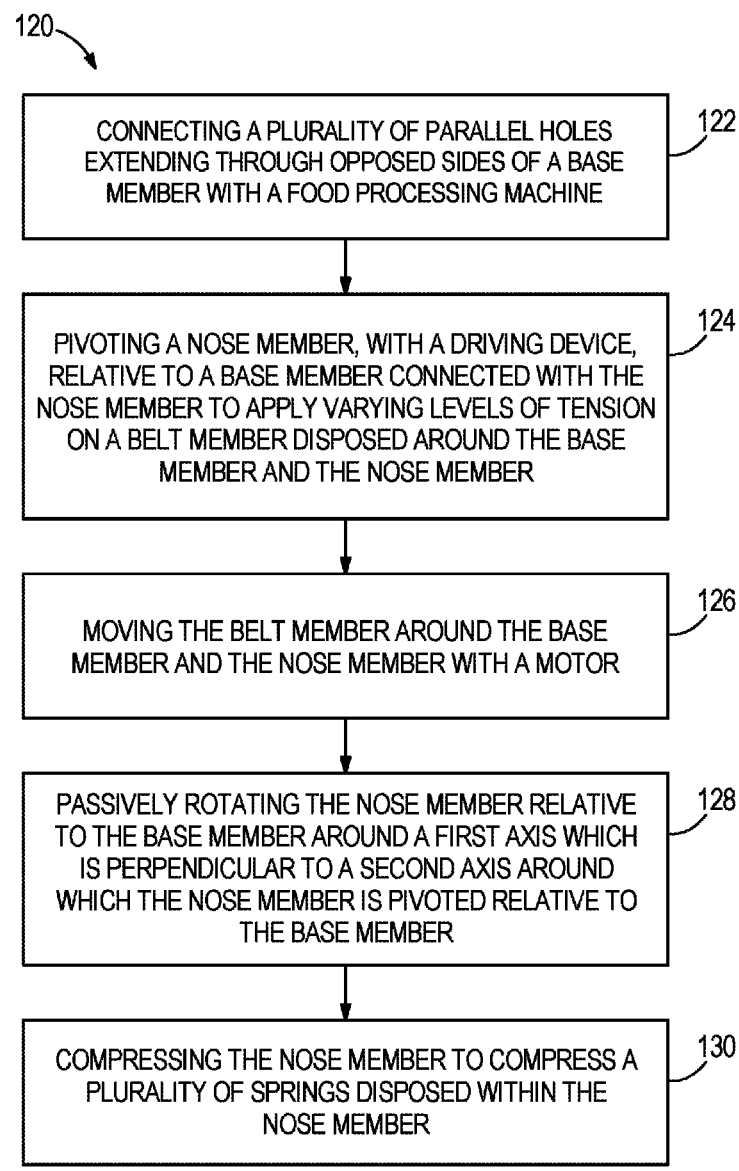
FIG. 12 illustrates a flowchart providing a method of operating a belt tensioner of a food processing machine.

FIG. 12 illustrates a flowchart providing a method 120 of operating a belt tensioner of a food processing machine. The method 120 may utilize any of the embodiments of the belt tensioner or food processing machines disclosed within this disclosure. Step 122 comprises connecting a plurality of parallel holes extending through opposed sides of the base member with the food processing machine. Step 124 comprises pivoting a nose member, with a driving device, relative to a base member connected with the nose member to apply varying levels of tension on a belt member disposed around the base member and the nose member. In one embodiment of step 124, the driving device pivoting the nose member is a pneumatic cylinder. In other embodiments of step 124, the driving device pivoting the nose member may vary. In yet another embodiment, step 124 comprises the driving device pivoting a rod, which is connected with and between the nose member and the base member, to pivot the nose member connected with the rod so that the nose member and the rod pivot relative to and around a second axis through the base member.

Step 126 comprises moving the belt member around the base member and the nose member with a motor. In one embodiment of step 126, the belt member is moved between opposed rails of the base member. Step 128 comprises passively rotating the nose member relative to the base member around a first axis which is perpendicular to a second axis around which the nose member is pivoted relative to the base member. In one embodiment of step 128, the nose member which is being passively rotated relative to the base member is connected with a rod to the base member. Step 130 comprises compressing the nose member to compress a plurality of springs disposed within the nose member. In other embodiments, one or more steps of the method 120 may vary in substance or in order, one or more steps of the method 120 may not be followed, or one or more additional steps may be added to the method 120.

As shown collectively in FIGS. 6, 7, and 8, the first frame 20 is configured to be moved up and down in directions 132 and 134 by the motor 52 rotating the screw rod 54 thereby moving the first frame 20 relative to the second frame 21 to orient the plurality of in-feed cartridges 72 at varying heights as needed for the particular type/shape of food product 12 (FIG. 1) being fed through the upper in-feed 26. The sensor 70 which is connected with the second frame 21 is configured to detect a height of the first frame 20 or to detect a height of the plurality of in-feed cartridges 72.

The plurality of attachment shafts 56 are fixedly connected in parallel spaced-apart relation with the first frame 20. The plurality of attachment shafts 56 of the first frame 20 are disposed through the plurality of parallel holes 86 of the base members 74. The plurality of spaced-apart connection members 60 comprise threaded holes spaced-apart throughout the plurality of attachment shafts 56 and threaded fasteners which connect to and disconnect from the threaded holes. The plurality of spaced-apart connection members 60 allow the base members 74 of the plurality of in-feed cartridges 72 to be connected with the plurality of attachment shafts 56 in fixed spaced-apart relation, and to be subsequently disconnected from the plurality of attachment shafts 56 and reconfigured as needed to allow for varying spacing and for varying numbers of the plurality of in-feed cartridges 72 to be connected along the plurality of attachment shafts 56. For instance, any number of in-feed cartridges 72 can be connected with and along the plurality of attachment shafts 56 with varying spacing configurations.

The plurality of bracket-attachment shafts 62 connect the bracket 69 in spaced-apart relation to the first frame 20. The tension member 64 is rotatably attached to and between the first fame 20 and the bracket 69 and is configured to rotate in either of directions 136 or direction 138. When the tension member 64 is rotated in direction 138 the tension member 64 reduces the tension on the belt 25, of each of the in-feed cartridges 72, disposed around the tension member 64 to allow the belt 25 of each of the in-feed cartridges 72 to be installed or removed. When the tension member 64 is rotated in direction 136 the tension member 64 increases the tension on the belt 25, of each of the in-feed cartridges 72, disposed around the tension member 64 to allow the belt 25 of each of the in-feed cartridges 72 to be tensioned after installation.

The plurality of motor shafts 66 extend from the plurality of motors 68, through holes 140 in the bracket 69. The driving belts 65 are connected between the plurality of motor shafts 66 and the tension member 64. The belt members 84 of the in-feed cartridges 72 are disposed against and around the tension member 64, against and around the base members 74 in-between the opposed rails 90, and against and around the nose members 78. The plurality of motors 68 rotate the plurality of motor shafts 66, which rotate the driving belts 65, which rotate the tension member 64, which rotates the belt members 84 of the in-feed cartridges 72, which rotate against and around the base members 74 in-between the opposed rails 90, against and around the nose members 78, and against and around the tension member 64. The movement of the belt members 84 of the in-feed cartridges 72 against the food-product 12 (FIG. 1) moves the food-product 12 in direction 46 (FIG. 1) to the slicing device 30 (FIG. 1). Although two motors 68 are shown to drive the plurality of in-feed cartridges 72, in other embodiments, a varying number of motors 68 can be used to drive any number of in-feed cartridges 72. For instance, in one embodiment only one motor 68 can be used to drive the plurality of in-feed cartridges. In another embodiment, one to two motors 68 can be used to drive one to five in-feed cartridges 72. In other embodiments, the number of motors 68 and in-feed cartridges 72 can vary.

As shown in FIG. 10, the driving device 82 of each in-feed cartridge 72 is configured to independently pivot its rod 76 and its connected nose member 78 in either of directions 98 or 100 around the second axis 96 of the base member 74. In such manner, the nose member 78 of each in-feed cartridge 72 can independently be pivoted in direction 98 around the second axis 96 of the base member 74 to lower the nose member 78 towards the food product 12 (FIG. 1) to provide increasing tension on the belt member 84 against the food product 12 (FIG. 1) or pivoted in direction 100 around the second axis 96 of the base member 74 to raise the nose member 78 away from the food product 12 (FIG. 1) to provide decreasing tension on the belt member 84 against the food product 12 (FIG. 1). By independently moving the nose members 78 of each in-feed cartridge 72 in varying amounts in direction 98, each nose member 78 can provide differing levels of tension on their respective belt member 84.

Multiple in-feed cartridges 72 can be used to independently apply varying levels of tension on their respective belt member 84 against the same food product 12 (FIG. 1) in the event that two or more in-feed cartridges 72 are being used to move the same food product 12 (FIG. 1). Multiple in-feed cartridges 72 can also be used to independently apply varying levels of tension on their respective belt member 84 against differing food products 12 (FIG. 1) in the event that separate in-feed cartridges 72 are being used to separately and independently move food product 12 (FIG. 1), for instance when one in-feed cartridge 72 is being used to move a first food product, and a second in-feed cartridge 72 is being used to move a second food product.

As shown in FIG. 10, the nose member 78 of each in-feed cartridge 72 is configured to passively rotate in either of directions 104 or 106 around first axis 108 of the rod 76 which is perpendicular to second axis 96 through the base member 74. In such manner, the nose member 78 of each in-feed cartridge 72 can independently passively rotate in either of directions 104 or 106 to accommodate varying shaped food products 12 (FIG. 1). In the event that two or more in-feed cartridges 72 are being used to move the same food product 12 (FIG. 1), their respective nose members 78 can independently passively rotate in either of directions 104 or 106 in order to accommodate differing shaped areas of the same food product 12 (FIG. 1). In the event that two or more in-feed cartridges 72 are being independently used to move separate food products 12 (FIG. 1), their respective nose members 78 can independently passively rotate in either of directions 104 or 106 in order to independently move the separate varying shaped food products 12 (FIG. 1).

As shown in FIG. 10, the plurality of springs 110 in the nose member 78 of each of the in-feed cartridges 72 allow the bottom surface 114 of the nose member 78 to independently passively compress or expand as the belt member 84 comes into contact with food product 12 (FIG. 1) of irregular shapes. In the event that two or more in-feed cartridges 72 are being used to move the same food product 12 (FIG. 1), the plurality of springs 110 in their respective nose members 78 can independently passively compress or expand as their respective belt members 84 come into contact with differing shaped areas of the same food product 12 (FIG. 1). In the event that two or more in-feed cartridges 72 are being independently used to move separate food products 12 (FIG. 1), the plurality of springs 110 in their respective nose members 78 can independently passively compress or expand as their respective belt members 84 independently come into contact with differing shaped areas of the separate food products 12 (FIG. 1).

The upper in-feed 26 of FIG. 6 is highly configurable and reconfigurable. Any number of motors 68 can be used to drive any number of in-feed cartridges 72. The in-feed cartridges 72 can be aligned in varying numbers and spacing along the plurality of attachments shafts 56 using the plurality of spaced-apart connection members 60. The plurality of in-feed cartridges 72 can be used together to simultaneously move the same food product 12 (FIG. 1), or the plurality of in-feed cartridges 72 can be used independently and separately to move separate food products 12 (FIG. 1). The tension member 64 is adapted to rotate in either of directions 136 or 138 in order to increase or decrease the tension on the belt member 84 of each in-feed cartridge 72 to make it easy to configure, reconfigure, disconnect, or reconnect each in-feed cartridge 72 to/from the upper in-feed 26. The first frame 20 of the upper in-feed 26 is controllable with the control system 22 (FIG. 1) to move vertically with respect to the second frame 22 of the upper in-feed 26 in order to vertically orient the plurality of in-feed cartridges 72 at varying heights to accommodate varying dimensioned food products 12 (FIG. 1). The driving device 82 of each in-feed cartridge 72 allows the control system 22 (FIG. 1) to independently pivot the nose member 78 of each in-feed cartridge 72 in either of directions 98 or 100 in order to provide varying tension on the belt member 84 of each in-feed cartridge 72 to accommodate varying types/shapes of food product 12 (FIG. 1). The nose member 78 of each in-feed cartridge 72 is adapted to independently passively rotate in either of directions 104 or 106 to accommodate varying types/shapes of food product 12 (FIG. 1). The nose member 78 of each in-feed cartridge 72 is adapted to passively expand and compress due to their plurality of springs 110 allowing them to accommodate varying types/shapes of food product 12 (FIG. 1).

Figure 13:
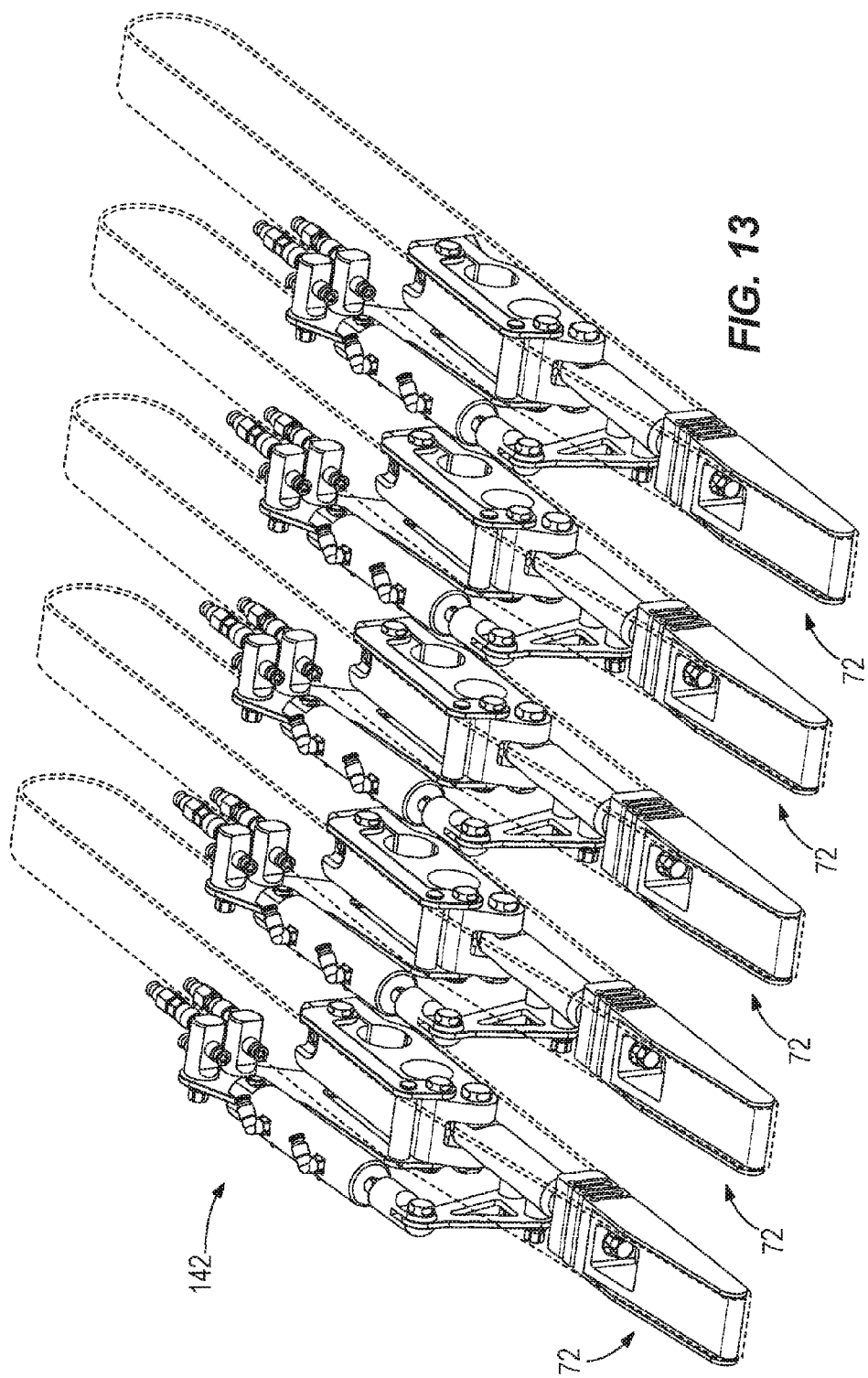
FIG. 13 illustrates a top perspective view of one embodiment of a kit for a food processing machine.

FIG. 13 illustrates a top perspective view of one embodiment of a kit 142 for a food processing machine 10 (FIG. 1). The kit 142 comprises a plurality of in-feed cartridges 72. The plurality of in-feed cartridges 72 are each identical to the in-feed cartridge 72 described herein (see entire disclosure but particularly the discussion involving FIGS. 9 and 10). Any number of the plurality of in-feed cartridges 72 can be configured in different alignments and configurations to the food processing machine 10 of FIG. 1 to accommodate varying types/shapes of food product 12 (FIG. 1). A varying number of motors 68 (FIG. 6) can be used to drive the in-feed cartridges 72. Although five in-feed cartridges 72 are shown, in other embodiments the kit 142 can contain any number of in-feed cartridges 72. In other embodiments, the in-feed cartridges 72 can vary.

Referring to FIG. 6, to configure the upper in-feed 26, a first number of the in-feed cartridges 72 of the kit 142 of FIG. 13 is selected. In other embodiments, any number of in-feed cartridges 72 can be selected. The first number of the selected in-feed cartridges 72 is then connected with the upper in-feed 26 of FIG. 6 by removing the bracket 69 and connecting the attachment shafts 56 with the plurality of parallel holes 86 of the base members 74 of the in-feed cartridges 72 with the plurality of spaced-apart connection members 60 to align the in-feed cartridges 72 in the desired spaced-apart configuration for the food product 12 (FIG. 1) to be handled.

The belt members 84 of the in-feed cartridges 72 are disposed against and around the tension member 64 which has been moved in direction 138 to a reduced tension position, against and around the base members 74 in-between the opposed rails 90, and against and around the nose members 78. The number of motors 68 to be used are selected. The driving belts 65, connected to the plurality of motors 68, are connected between the plurality of motor shafts 66 and the tension member 64. The bracket 69 is reattached.

The tension member 64 is moved in direction 136 to an increased tension position to assert tension on the belt members 84 of the in-feed cartridges 72. The first frame 20 is moved vertically with respect to the second frame 21 to align the in-feed cartridges 72 close or against the food product 12 (FIG. 1). The driving device 82 of each in-feed cartridge 72 pivots the nose member 78 of each in-feed cartridge 72 in direction 98 in order to abut the belt member 84 of each in-feed cartridge 72 against the food product 12 (FIG. 1) to provide varying tension on the belt member 84 of each in-feed cartridge 72 to accommodate the type/shape of the food product 12 (FIG. 1). The belt member 84 of each in-feed cartridge 72 is driven by the motors 68 to move the food product 12 (FIG. 1) in direction 46 (FIG. 1) to the slicing device 30 (FIG. 1).

The nose member 78 of each in-feed cartridge 72 passively rotates in either of directions 104 or 106 to accommodate the type/shape of the food product 12 (FIG. 1) as the belt member 84 of each in-feed cartridge 72 moves the food product 12 (FIG. 1) to the slicing device 30 (FIG. 1). Simultaneously, the nose member 78 of each in-feed cartridge 72 passively expands and compresses due to their plurality of springs 110 allowing them to accommodate the type/shape of the food product 12 (FIG. 1).

When the food processing device 10 (FIG. 1) needs to be reconfigured to accommodate the food product 12 (FIG. 1) in a varying configuration, or to accommodate a varying type of food product 12 (FIG. 1), the bracket 69 is removed, the plurality of spaced-apart connection members 60 are disconnected, the tension member 64 is moved in direction 138 to the decreased tension position, and the in-feed cartridges 72 are then realigned in a different configuration and/or a second number (different than the first number) of in-feed cartridges 72 of the kit 142 of FIG. 13 are connected with the attachment shafts 56 of the upper in-feed 26. The attachment shafts 56 are connected with the plurality of parallel holes 86 of the base members 74 of the in-feed cartridges 72 with the plurality of spaced-apart connection members 60 to align the in-feed cartridges 72 in the desired spaced-apart configuration for the food product 12 (FIG. 1) to be handled.

The belt members 84 of the in-feed cartridges 72 are disposed against and around the tension member 64 which has been moved in direction 138 to a reduced tension position, against and around the base members 74 in-between the opposed rails 90, and against and around the nose members 78. The number of motors 68 to be used are selected. The driving belts 65, connected to the plurality of motors 68, are connected between the plurality of motor shafts 66 and the tension member 64. The bracket 69 is reattached.

The tension member 64 is moved in direction 136 to an increased tension position to assert tension on the belt members 84 of the in-feed cartridges 72. The first frame 20 is moved vertically with respect to the second frame 21 to align the in-feed cartridges 72 close or against the food product 12 (FIG. 1). The driving device 82 of each in-feed cartridge 72 pivots the nose member 78 of each in-feed cartridge 72 in direction 98 in order to abut the belt member 84 of each in-feed cartridge 72 against the food product 12 (FIG. 1) to provide varying tension on the belt member 84 of each in-feed cartridge 72 to accommodate the type/shape of the food product 12 (FIG. 1). The belt member 84 of each in-feed cartridge 72 is driven by the motors 68 to move the food product 12 (FIG. 1) in direction 46 (FIG. 1) to the slicing device 30 (FIG. 1).

The nose member 78 of each in-feed cartridge 72 passively rotates in either of directions 104 or 106 to accommodate the type/shape of the food product 12 (FIG. 1) as the belt member 84 of each in-feed cartridge 72 moves the food product 12 (FIG. 1) to the slicing device 30 (FIG. 1). Simultaneously, the nose member 78 of each in-feed cartridge 72 passively expands and compresses due to their plurality of springs 110 allowing them to accommodate the type/shape of the food product 12 (FIG. 1). This process can be repeated as often as necessary to allow the food processing machine 10 (FIG. 1) to process varying types/dimensions of food product 12 (FIG. 1).

Figure 14:
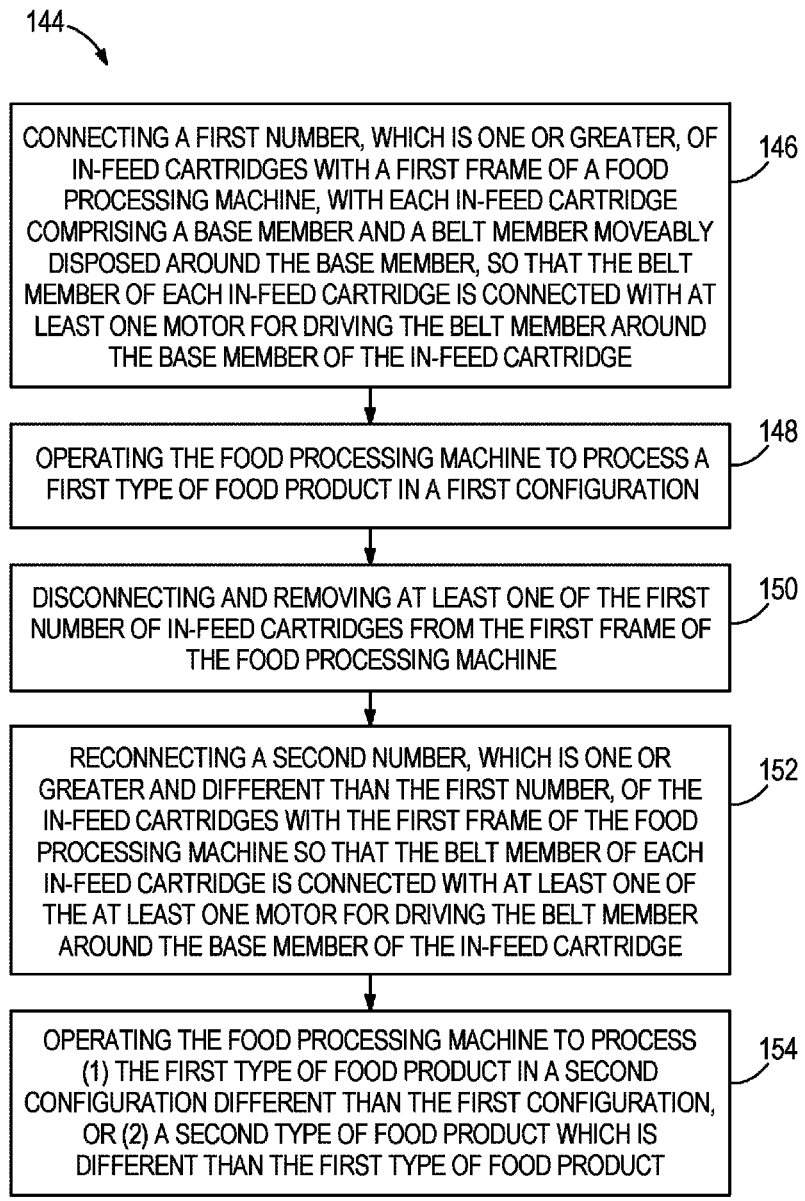
FIG. 14 illustrates one embodiment of a method of operating a food processing machine.

FIG. 14 illustrates one embodiment of a method 144 of operating a food processing machine. The method 144 may utilize any of the embodiments of the food processing machine disclosed herein. In other embodiments, the method 144 may utilize varying food processing machines. In step 146, a first number, which is one or greater, of in-feed cartridges is connected with a first frame of a food processing machine, with each in-feed cartridge comprising a base member and a belt member moveably disposed around the base member, so that the belt member of each in-feed cartridge is connected with at least one motor for driving the belt member around the base member of the in-feed cartridge. In step 148, the food processing machine is operated to process a first type of food product in a first configuration. In step 150, at least one of the first number of in-feed cartridges is disconnected and removed from the first frame of the food processing machine. In step 152, a second number, which is one or greater and different than the first number, of the in-feed cartridges is reconnected with the first frame of the food processing machine so that the belt member of each in-feed cartridge is connected with at least one of the at least one motor for driving the belt member around the base member of the in-feed cartridge. In step 154, the food processing machine is operated to process (1) the first type of food product in a second configuration different than the first configuration, or (2) a second type of food product which is different than the first type of food product.

In one embodiment of the method 144, step 146 comprises connecting the first number of the in-feed cartridges with a plurality of attachment shafts in a first spaced-apart configuration, and step 152 comprises reconnecting the second number of the in-feed cartridges with the plurality of attachment shafts in a second spaced-apart configuration which is different than the first spaced-apart configuration.

In another embodiment of the method 144: step 146 comprises connecting the belt members of the first number of the in-feed cartridges with a first number of motors; and step 152 comprises reconnecting the belt members of the second number of the in-feed cartridges with a second number of motors different than the first number of motors.

In another embodiment of the method 144: step 146 comprises disposing the belt members of the first number of the in-feed cartridges around a tension member and moving the tension member to an increased-tension position to provide increased tension on the belt members of the first number of the in-feed cartridge; step 150 comprises moving the tension member to a decreased-tension position to provide decreased tension on the belt members of the at least one of the first number of in-feed cartridges; and step 152 comprises disposing the belt members of the second number of the in-feed cartridges around the tension member and moving the tension member to the increased-tension position to provide increased tension on the belt members of the second number of the in-feed cartridge.

In another embodiment, the method 144 further comprises the step of moving, with an additional motor, the first frame vertically relative to a second frame to which the first frame is connected with in order to orient the first number of the in-feed cartridges at varying heights; and the step of moving, with the additional motor, the first frame vertically relative to the second frame in order to orient the second number of the in-feed cartridges at varying heights. The method 144 may further comprise the step of (1) detecting, with a sensor, a height of the first frame, or (2) detecting, with the sensor, a height of the first number of the in-feed cartridges and a height of the second number of the in-feed cartridges.

In another embodiment, the method 144 further comprises: the step of each of the in-feed cartridges comprising a nose member pivotally connected with its respective base member; the step of pivoting the nose member of each of the first number of in-feed cartridges, relative to its respective base member, so that its respective belt member is disposed against the first type of food product; and the step of pivoting the nose member, relative to its respective base member, of each of the second number of in-feed cartridges so that its respective belt member is disposed against the (1) first type of food product in the second configuration different than the first configuration, or (2) second type of food product which is different than the first type of food product.

In another embodiment, the method 144 further comprises: the step of each of the in-feed cartridges comprising a nose member passively rotationally connected with its respective base member; the step of passively rotating the nose member of each of the first number of in-feed cartridges, relative to its respective base member, so that its respective belt member is disposed against the first type of food product; and the step of passively rotating the nose member, relative to its respective base member, of each of the second number of in-feed cartridges so that its respective belt member is disposed against the (1) first type of food product in the second configuration different than the first configuration, or (2) second type of food product which is different than the first type of food product.

In another embodiment, the method 144 further comprises: the step of each of the in-feed cartridges comprising a nose member connected with its respective base member, with each nose member comprising a plurality of spring members disposed within the nose member; the step of passively compressing or passively expanding the spring members of each of the first number of in-feed cartridges as a result of the first type of food product contacting the respective belt member of each of the first number of in-feed cartridges; and the step of passively compressing or passively expanding the spring members of each of the second number in-feed cartridges as a result of the (1) first type of food product in the second configuration different than the first configuration contacting the respective belt member of each of the second number of in-feed cartridges, or (2) second type of food product which is different than the first type of food product contacting the respective belt member of each of the second number of in-feed cartridges.

In other embodiments, one or more steps of the method 144 may vary in substance or in order, one or more steps of the method 144 may be eliminated, or one or more additional steps may be added to the method 144.

One or more embodiments of the disclosure reduces or eliminates one or more issues of one or more of the existing in-feeds and/or belt tensioners for food processing machines by providing: simple, highly configurable belt tensioners to accommodate varying type/sized food product; belt tensioners which have both automated and passive belt tensioning adjustment mechanisms to accommodate varying type/sized food product; belt tensioners which are highly reliable leading to less down-time and maintenance savings; and belt tensioners which are easier to produce leading to manufacturing savings.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A belt tensioner for a food processing machine comprising:
   a base member;
   a nose member pivotally connected with the base member;
   a belt member moveably disposed around the base member and the nose member;
   a driving device configured to pivotally move the nose member relative to the base member, wherein as the nose member pivotally moves relative to the base member the nose member applies variable levels of tension on the belt member; and
   at least one of the following: (1) the belt tensioner further comprises a rod connected with and between the nose member and the base member, wherein the rod is pivotally connected with the base member to provide pivotal movement of the nose member relative to the base member as the rod pivotally moves relative to the base member; (2) the nose member is passively rotatably connected with the base member around a first axis which is perpendicular to a second axis around which the nose member pivots relative to the base member; or (3) the base member further comprises a plurality of parallel holes extending through opposed sides of the base member which are configured to connect the base member with the food processing machine.

2. The belt tensioner of claim 1 wherein the driving device comprises a pneumatic cylinder.

3. The belt tensioner of claim 1 further comprising (1) the rod connected with and between the nose member and the base member, wherein the rod is pivotally connected with the base member to provide pivotal movement of the nose member relative to the base member as the rod pivotally moves relative to the base member.

4. The belt tensioner of claim 3 wherein the driving device is connected with the rod.

5. The belt tensioner of claim 1 wherein the nose member comprises a plurality of springs disposed within the nose member.

6. The belt tensioner of claim 1 wherein (2) the nose member is passively rotatably connected with the base member around the first axis which is perpendicular to the second axis around which the nose member pivots relative to the base member.

7. The belt tensioner of claim 6 further comprising a rod connected with and between the nose member and the base member, wherein the rod is pivotally connected with the base member to provide pivotal movement of the nose member relative to the base member as the rod pivotally moves relative to the base member, wherein the nose member is passively rotatably connected with the rod around the first axis.

8. The belt tensioner of claim 1 wherein the base member further comprises opposed rails, extending perpendicular to the belt member along a length of the belt member, with the belt member disposed between the opposed rails.

9. The belt tensioner of claim 1 wherein (3) the base member further comprises the plurality of parallel holes extending through the opposed sides of the base member which are configured to connect the base member with the food processing machine.

10. A belt tensioner for a food processing machine comprising:
    a base member;
    a nose member pivotally connected with the base member, the nose member comprising a plurality of springs disposed within the nose member, wherein the nose member is passively rotatably connected with the base member around a first axis which is perpendicular to a second axis around which the nose member pivots relative to the base member;
    a belt member moveably disposed around the base member and the nose member; and
    a driving device configured to pivotally move the nose member relative to the base member around the second axis, wherein as the nose member pivotally moves relative to the base member the nose member applies variable levels of tension on the belt member.

11. The belt tensioner of claim 10 wherein the base member further comprises opposed rails with the belt member disposed between the opposed rails.

12. A method of operating a belt tensioner of a food processing machine comprising:
    pivoting a nose member, with a driving device, relative to a base member connected with the nose member to apply varying levels of tension on a belt member disposed around the base member and the nose member;
    moving the belt member around the base member and the nose member with a motor; and
    at least one of the following: (1) wherein the pivoting the nose member relative to the base member comprises pivoting the nose member and a rod, connected with and between the nose member and the base member, relative to the base member; (2) further comprising passively rotating the nose member relative to the base member around a first axis, wherein the pivoting the nose member relative to the base member comprises pivoting the nose member relative to the base member around a second axis which is perpendicular to the first axis; or (3) further comprising connecting a plurality of parallel holes extending through opposed sides of the base member with the food processing machine.

13. The method of claim 12 wherein the pivoting the nose member relative to the base member comprises pivoting the nose member relative to the base member with a pneumatic cylinder.

14. The method of claim 12 wherein (1) the pivoting the nose member relative to the base member comprises pivoting the nose member and the rod, connected with and between the nose member and the base member, relative to the base member.

15. The method of claim 14 wherein the pivoting the nose member and the rod relative to the base member comprises the driving device pivoting the rod, which is connected with the driving device, to pivot the nose member connected with the rod.

16. The method of claim 12 further comprising compressing the nose member to compress a plurality of springs disposed within the nose member.

17. The method of claim 12 further comprising (2) passively rotating the nose member relative to the base member around the first axis, wherein the pivoting the nose member relative to the base member comprises pivoting the nose member relative to the base member around the second axis which is perpendicular to the first axis.

18. The method of claim 17 wherein the pivoting the nose member relative to the base member comprises pivoting the nose member and a rod, connected with and between the nose member and the base member, relative to the base member around the second axis, and wherein the rotating the nose member relative to the base member around the first axis comprises passively rotating the nose member connected with the rod around the first axis.

19. The method of claim 12 wherein the moving the belt member around the base member and the nose member with the motor comprises moving the belt member between opposed rails of the base member, the opposed rails extending perpendicular to the belt member along a length of the belt member.

20. The method of claim 12 further comprising (3) connecting the plurality of parallel holes extending through the opposed sides of the base member with the food processing machine.

\* \* \* \* \*